(12) United States Patent
Sugiyama

(10) Patent No.: US 10,401,070 B2
(45) Date of Patent: Sep. 3, 2019

(54) CONSTANT TEMPERATURE LIQUID CIRCULATION APPARATUS AND TEMPERATURE ADJUSTMENT METHOD FOR CONSTANT TEMPERATURE LIQUID

(71) Applicant: SMC CORPORATION, Tokyo (JP)

(72) Inventor: Shintaro Sugiyama, Sagamihara (JP)

(73) Assignee: SMC CORPORATION, Tokyo (JP)

( * ) Notice: Subject to any disclaimer, the term of this patent is extended or adjusted under 35 U.S.C. 154(b) by 591 days.

(21) Appl. No.: 14/340,964

(22) Filed: Jul. 25, 2014

(65) Prior Publication Data

US 2015/0052917 A1    Feb. 26, 2015

(30) Foreign Application Priority Data

Jun. 4, 2013   (JP) .................................. 2013-117800

(51) Int. Cl.
    *F25B 49/02*        (2006.01)
    *F25B 7/00*         (2006.01)
    (Continued)

(52) U.S. Cl.
    CPC .............. *F25B 49/022* (2013.01); *F25B 7/00* (2013.01); *F25B 49/02* (2013.01); *F25B 25/005* (2013.01); *F25B 2341/065* (2013.01); *F25B 2500/27* (2013.01); *F25B 2600/0251* (2013.01); *F25B 2600/23* (2013.01); *F25B 2600/2513* (2013.01); *F25B 2700/1931* (2013.01);
    (Continued)

(58) Field of Classification Search
    CPC .. F25B 7/00; F25B 25/005; F25B 2600/0251; F25B 2600/2513; F25B 2500/27
    See application file for complete search history.

(56) References Cited

U.S. PATENT DOCUMENTS 5,224,354 A * 7/1993 Ito .......................... F25B 41/062
                                                   62/196.3
6,637,226 B2 * 10/2003 Watanabe ............... F25B 41/04
                                                   62/196.4
(Continued)

FOREIGN PATENT DOCUMENTS

JP         56-44568 A     4/1981
JP         59-183255 A   10/1984
(Continued)

OTHER PUBLICATIONS

U.S. Appl. No. 14/317,674, filed Jun. 27, 2014, Sugiyama.
(Continued)

*Primary Examiner* — Keith M Raymond
*Assistant Examiner* — Nael N Babaa
(74) *Attorney, Agent, or Firm* — Oblon, McClelland, Maier & Neustadt, L.L.P.

(57) ABSTRACT

A cooling liquid circulation apparatus comprising a liquid for a circuit which circularly supplies a liquid for adjusting temperature of a load, a refrigeration circuit which adjusts the temperature of the liquid by thermal exchange with a coolant to a set temperature, and a control unit which controls the overall apparatus. A temperature adjustment method by connecting in series and circularly of a circuit to circularly supply the liquid for adjusting temperature to a load and a refrigeration circuit for adjusting the temperature of the liquid with a coolant by heat exchange.

5 Claims, 3 Drawing Sheets

(51) Int. Cl.
*F28D 21/00* (2006.01)
*F25B 25/00* (2006.01)

(52) U.S. Cl.
CPC ............ *F25B 2700/21151* (2013.01); *F28D 2021/0028* (2013.01); *Y02B 30/72* (2013.01)

(56) References Cited

U.S. PATENT DOCUMENTS

| | | | | |
|---|---|---|---|---|
| 7,040,107 | B2* | 5/2006 | Lee | F25B 1/04 417/325 |
| 7,690,213 | B2 | 4/2010 | Inaba | |
| 2003/0014988 | A1* | 1/2003 | Watanabe | F25B 41/04 62/201 |
| 2004/0040339 | A1* | 3/2004 | Matsumoto | F04C 18/3564 62/470 |
| 2005/0072173 | A1* | 4/2005 | Yamasaki | F04C 23/001 62/196.2 |
| 2007/0204637 | A1 | 9/2007 | Fujii et al. | |
| 2010/0180630 | A1* | 7/2010 | Ogawa | F25B 41/04 62/498 |

FOREIGN PATENT DOCUMENTS

| | | | |
|---|---|---|---|
| JP | 4-13051 | A | 1/1992 |
| JP | 4-98050 | A | 3/1992 |
| JP | 7-218005 | A | 8/1995 |
| JP | 2000-274789 | A | 10/2000 |
| JP | 2002-195698 | A | 7/2002 |
| JP | 2003-28515 | A | 1/2003 |
| JP | 2007-255411 | A | 10/2007 |
| JP | 2008-74377 | A | 4/2008 |
| JP | 2009-151356 | A | 7/2009 |
| JP | 2010-255993 | A | 11/2010 |

OTHER PUBLICATIONS

Office Action dated Sep. 30, 2014 in Japanese Patent Application No. 2013-117800 (with English language translation).
International Search Report dated Sep. 16, 2014 in PCT/JP2014/066202 (with English Translation of Category of Cited Documents).
Office Action dated Mar. 18, 2014 in Japanese Patent Application No. 2013-117800 (with English language translation).
Decision to Dismiss the Amendment dated May 12, 2015 in Japanese Patent Application No. 2013-117800 (with English language translation).
Decision of Refusal dated May 12, 2015 in Japanese Patent Application No. 2013-117800 (with English language translation).

\* cited by examiner

CONSTANT TEMPERATURE LIQUID CIRCULATION APPARATUS AND TEMPERATURE ADJUSTMENT METHOD FOR CONSTANT TEMPERATURE LIQUID

TECHNICAL FIELD

The present invention relates to a constant temperature liquid circulation apparatus which heats or cools a load by supplying temperature-adjusted constant temperature liquid to the load, and a temperature adjustment method of the constant temperature liquid.

BACKGROUND ART

A constant temperature liquid circulation apparatus which heats or cools a load by supplying temperature-adjusted constant temperature liquid to the load is known, as described in PTL 1, a Japanese Unexamined Patent Application Publication No. 2003-028515, for example. As schematically illustrated in FIG. 3, a constant temperature liquid circulation apparatus generally includes a constant temperature liquid circuit 41 which circularly supplies a constant temperature liquid which temperature has been adjusted to a load 40, a refrigeration circuit 42 which adjusts the temperature of the constant temperature liquid, and a control unit 43 which controls the overall device.

The constant temperature liquid circuit 41 includes a tank 44 which accommodates the constant temperature liquid, a pump 45 which supplies the constant temperature liquid within the tank 44 to the load 40, and a temperature sensor 46 which measures the temperature of the constant temperature liquid supplied to the load 40. The refrigeration circuit 42 includes a compressor 47 which compresses the coolant in a gaseous state into a high-temperature high-pressure gaseous coolant, a condenser 48 which cools the high-temperature high-pressure gaseous coolant fed from the compressor 47 so as to be a high-pressure liquid coolant, a first electronic expansion valve 49 which expands the high-pressure liquid coolant fed from the condenser 48 so as to be a low-temperature low-pressure liquid coolant, and an evaporator 50 which evaporates the low-temperature low-pressure liquid coolant fed from the first electronic expansion valve 49, by thermal exchange with the constant temperature liquid, so as to be a low-pressure gaseous coolant, and which low-pressure gaseous coolant is then fed to the compressor 47.

The control unit 43 then controls the opening angle of the first electronic expansion valve 49, rotations of the compressor 47, and so forth, in accordance with the temperature of the constant temperature liquid measured by the temperature sensor 46, and adjusts the flow rate of coolant supplied to the evaporator 50, thereby adjusting the temperature of the constant temperature liquid so as to be closer to the set temperature.

On the other hand, with this type of constant temperature liquid circulation apparatus, when the compressor goes from an off state to an on state, if the pressure difference between the high pressure side (out port side) and low pressure side (in port side) of the compressor 47 is great, the compressor 47 cannot be activated due to overload. Accordingly, when the compressor 47 is in the off state, time needs to be allowed for the coolant to flow from the high pressure side to the lower pressure side so that the pressure difference is smaller (pressure equalizing operation time), thereafter which the compressor 47 can be turned on. This pressure equalizing operation time is generally around several minutes.

However, the refrigeration circuit 42 cannot run during this pressure equalizing operation time, so the rise in temperature of the constant temperature liquid due to the load 40 is great, which poses various problems for subsequent cooling or heating of the load 40.

Accordingly, the above-described constant temperature liquid circulation apparatus is provided with a bypass channel 51 connecting the high pressure side and low pressure side (out port side of the first electronic expansion valve 49) of the compressor 47, and a second electronic expansion valve 52 is connected to the bypass channel 51, so that when the compressor 47 turns off, this second electronic expansion valve 52 is opened such that part of the gaseous coolant at the high pressure side of the compressor 47 flows to the lower pressure side of the compressor 47, thus speeding up the pressure equalizing operation.

However, increased costs of the device and increased complexity of the structure is unavoidable when employing such a configuration for the pressure equalizing operation, since the electronic expansion valve 52 is expensive, and the bypass channel 51 also needs to be provided.

CITATION LIST

Patent Literature

PTL 1: Japanese Unexamined Patent Application Publication No. 2003-028515

SUMMARY OF INVENTION

Technical Problem

It is an object of the present invention to provide a constant temperature liquid circulation apparatus and constant temperature liquid temperature adjustment method, enabling temperature adjustment of the constant temperature liquid and pressure equalizing operations to be performed with a simple circuit configuration using one electronic expansion valve.

Solution to Problem

In order to achieve the above-described object, a constant temperature liquid circulation apparatus according to the present invention includes a constant temperature liquid circuit which circularly supplies a constant temperature liquid which temperature has been adjusted to a load, a refrigeration circuit which adjusts the temperature of the constant temperature liquid by thermal exchange with a coolant to a set temperature, and a control unit which controls the overall device. The constant temperature liquid circuit includes a tank which accommodates the constant temperature liquid, a pump which supplies the constant temperature liquid within the tank to the load, and a temperature sensor which measures the temperature of the constant temperature liquid supplied to the load. The refrigeration circuit is configured by a compressor which compresses the coolant in a gaseous state into a high-temperature high-pressure gaseous coolant, a condenser which cools the high-temperature high-pressure gaseous coolant fed from the compressor so as to be a high-pressure liquid coolant, an electronic expansion valve which expands the high-pressure liquid coolant fed from the condenser so as to be a low-temperature low-pressure liquid coolant, an evaporator which evaporates the low-temperature low-pressure liquid coolant fed from the electronic expansion valve by thermal exchange with the constant temperature liquid so as to be a low-pressure gaseous coolant and the feeds this low-pressure gaseous coolant to the compressor, being serially connected so as to form a circulation circuit. The control unit controls on/off of the compressor in accordance with the temperature of the constant temperature liquid measured by the temperature sensor, and when the compressor is on the electronic expansion valve is controlled so as to change the opening angle thereof in a restricted opened state smaller than when full-open, while when the compressor is turned off the opening angle of the electronic expansion valve is set to a pressure equalizing angle which is greater than the opening angle when in the controlled opened state, and the pressure equalizing angle is maintained a certain amount of time.

In the present invention, preferably, when the temperature of the constant temperature liquid exceeds the set temperature and reaches the upper limit value, the control unit performs control to turn the compressor on, and also temporarily increases the opening angle of the electronic expansion valve so as to be greater than the steady angle immediately before the compressor turns on, and then gradually be reduced to the steady angle, and when the temperature of the constant temperature liquid falls below the set temperature and reaches the lower limit value, performs control to turn the compressor off, and also sets the opening angle of the electronic expansion valve to the pressure equalizing angle, and sets the opening angle of the electronic expansion valve to the steady angle after a predetermined amount of time has elapsed.

Also, in a constant temperature liquid temperature adjustment method according to the present invention, in a constant temperature liquid circulation apparatus the temperature of the constant temperature liquid supplied to a load is measured by a temperature sensor and on/off of the compressor is controlled in accordance with the temperature of the constant temperature liquid, and when the compressor is on the electronic expansion valve is controlled so as to change the opening angle thereof in a restricted opened state smaller than when full-open, while when the compressor is turned off the opening angle of the electronic expansion valve is set to a pressure equalizing angle which is greater than the opening angle when in the controlled opened state, and the pressure equalizing angle is maintained a certain amount of time.

In this method, preferably, when the temperature of the constant temperature liquid exceeds the set temperature and reaches the upper limit value, control is performed to turn the compressor on, and also to temporarily increase the opening angle of the electronic expansion valve so as to be greater than the steady angle immediately before the compressor turns on, and then gradually be reduced to the steady angle, and when the temperature of the constant temperature liquid falls below the set temperature and reaches the lower limit value, control is performed to turn the compressor off, and also maintain the opening angle of the electronic expansion valve at the pressure equalizing angle for a predetermined amount of time, and after the predetermined amount of time has elapsed, to set the opening angle of the electronic expansion valve to the steady angle.

Advantageous Effects of Invention

According to the present invention, general temperature adjustment of the constant temperature liquid is performed by on/off control of the compressor, and fine temperature control when the compressor is on is performed by finely changing the opening angle of the electronic expansion valve in the controlled opened state. Also, when the compressor is turned off, the opening angle of the electronic expansion valve is maintained for a certain amount of time at the pressure equalizing angle which is greater than the opening angle when in the controlled opened state, thereby reducing the pressure difference between the high pressure side and lower pressure side in the refrigeration circuit so as to achieve pressure equalization, whereby overload when the compressor turns on the next time is prevented. Thus, stable on/off control of the compressor can be performed by performing pressure equalizing operations within the refrigeration circuit, and at the same time fine temperature control of the constant temperature liquid can be performed by performing fine flow control of the coolant, with a simple circuit construction using only one electronic expansion valve.

DESCRIPTION OF EMBODIMENT

Figure 1:
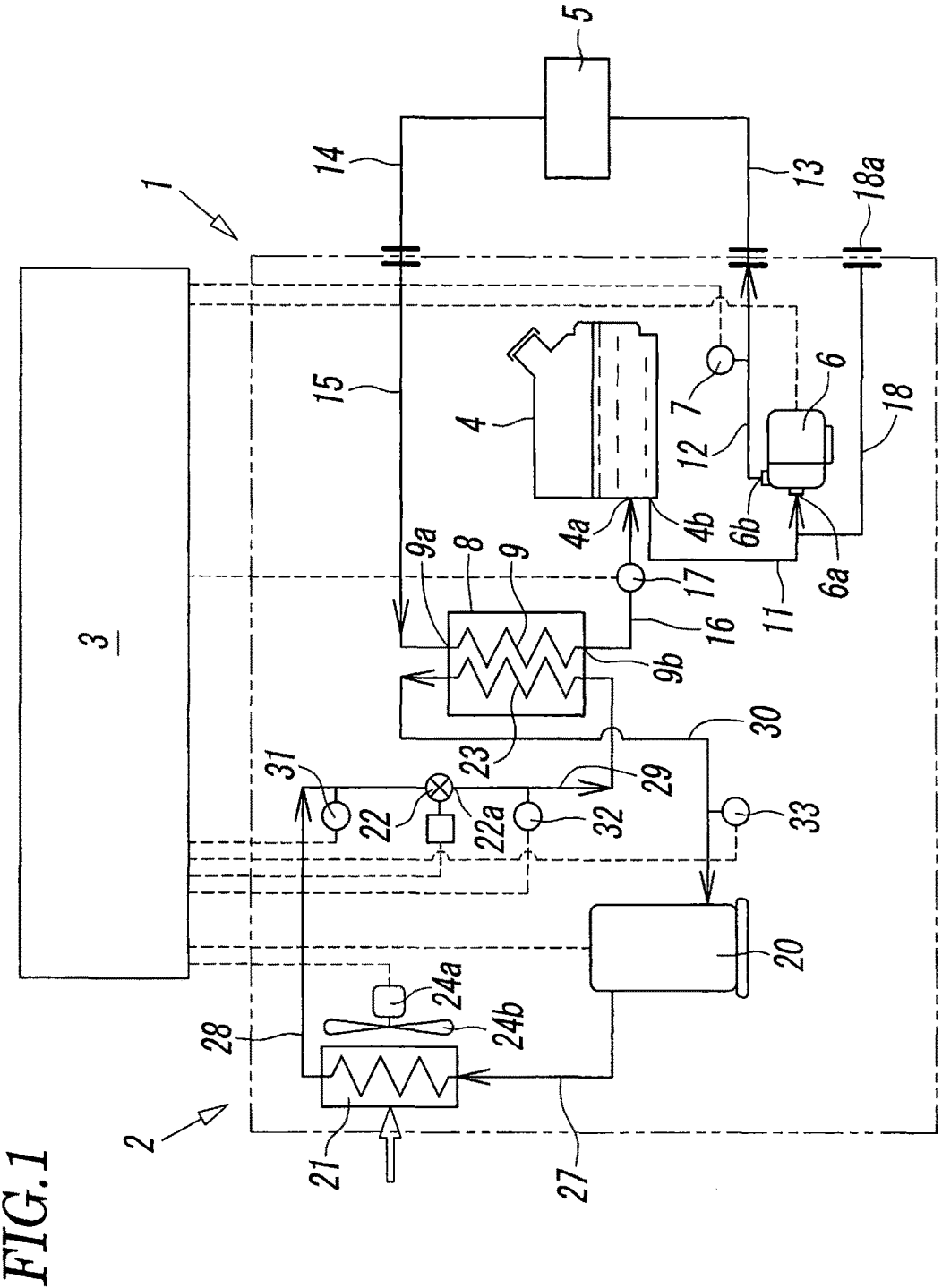
FIG. 1 is a block diagram of an embodiment of a constant temperature liquid circulation apparatus according to the present invention.

FIG. 1 illustrates an embodiment of a constant temperature liquid circulation apparatus according to the present invention. This constant temperature liquid circulation apparatus includes a constant temperature liquid circuit 1 which circularly supplies a constant temperature liquid which temperature has been adjusted, to a load so as to cool or heat the load. The constant temperature liquid circulation apparatus also includes a refrigeration circuit 2 which adjusts the temperature of the constant temperature liquid by thermal exchange with a coolant to a set temperature, and a control unit 3 which controls the overall device.

The constant temperature liquid circuit 1 also includes a tank 4 which accommodates the constant temperature liquid, a pump 6 which supplies the constant temperature liquid within the tank 4 to the load 5, a constant temperature liquid temperature sensor 7 which measures the temperature of the constant temperature liquid supplied to the load 5, and a cooling tube 9 which performs thermal exchange between the coolant of the refrigeration circuit 2 and the constant temperature liquid flowing back from the load 5, at a heat exchanger 8, so as to adjust the temperature of the constant temperature liquid to the set temperature. The constant temperature liquid of which the temperature has been adjusted at the cooling tube 9 is returned to the tank 4.

An outlet port 4b of the tank 4 and an intake 6a of the pump 6 are connected by a first supply line 11, and a discharge port 6b of the pump 6 and an inflow line 13 of the load 5 are connected by a second supply line 12, with the constant temperature liquid temperature sensor 7 being connected to the second supply line 12. An outflow line 14 of the load 5 is connected to a first return line 15 leading to an inlet port 9a of the cooling tube 9, and an outlet port 9b of the cooling tube 9 is connected to an inlet port 4a of the tank 4 by a second return line 16, with a flow switch 17 which measures the flow rate of the constant temperature liquid being connected to the second return line 16. A drain discharge pipe 18 is connected to the first supply line 11, with a drain discharge port 18a provided at one end of the drain discharge pipe 18.

On the other hand, the refrigeration circuit 2 is configured by a compressor 20, a condenser 21, an electronic expansion valve 22, and an evaporator 23, being serially connected so as to form a circulation circuit. The compressor 20 compresses the coolant in a gaseous state into a high-temperature high-pressure gaseous coolant. The condenser 21 cools the high-temperature high-pressure gaseous coolant fed from the compressor 20 through a first line 27, so as to be a high-pressure liquid coolant. The electronic expansion valve 22 expands the high-pressure liquid coolant fed from the condenser 21 through a second line 28, so as to be a low-temperature low-pressure gaseous coolant. The evaporator 23 evaporates the low-temperature low-pressure liquid coolant, fed from the electronic expansion valve 22 through a third line 29, by thermal exchange with the constant temperature liquid, so as to be a low-pressure gaseous coolant, which is then fed to the compressor 20 through a fourth line 30. The condenser 21 is an air-cooled condenser which cools the coolant by a fan 24b driven by an electric motor 24a.

A coolant pressure sensor 31 which measures the pressure of liquid coolant is connected to the second line 28. A first coolant temperature sensor 32, which measures the temperature of the liquid coolant at an outlet port 22a of the electronic expansion valve 22, is connected to the third line 29. A second coolant temperature sensor 33, which measures the temperature of the gaseous coolant being taken into the compressor 20, is connected to the fourth line 30.

The pump 6, constant temperature liquid temperature sensor 7, and flow switch 17 of the constant temperature liquid circuit 1, and the compressor 20, and the electric motor 24a of the condenser 21, electronic expansion valve 22, coolant pressure sensor 31, first coolant temperature sensor 32, the second coolant temperature sensor 33 of the refrigeration circuit 2, are each connected to the control unit 3, such that the entire device is controlled by the control unit 3.

Figure 2:
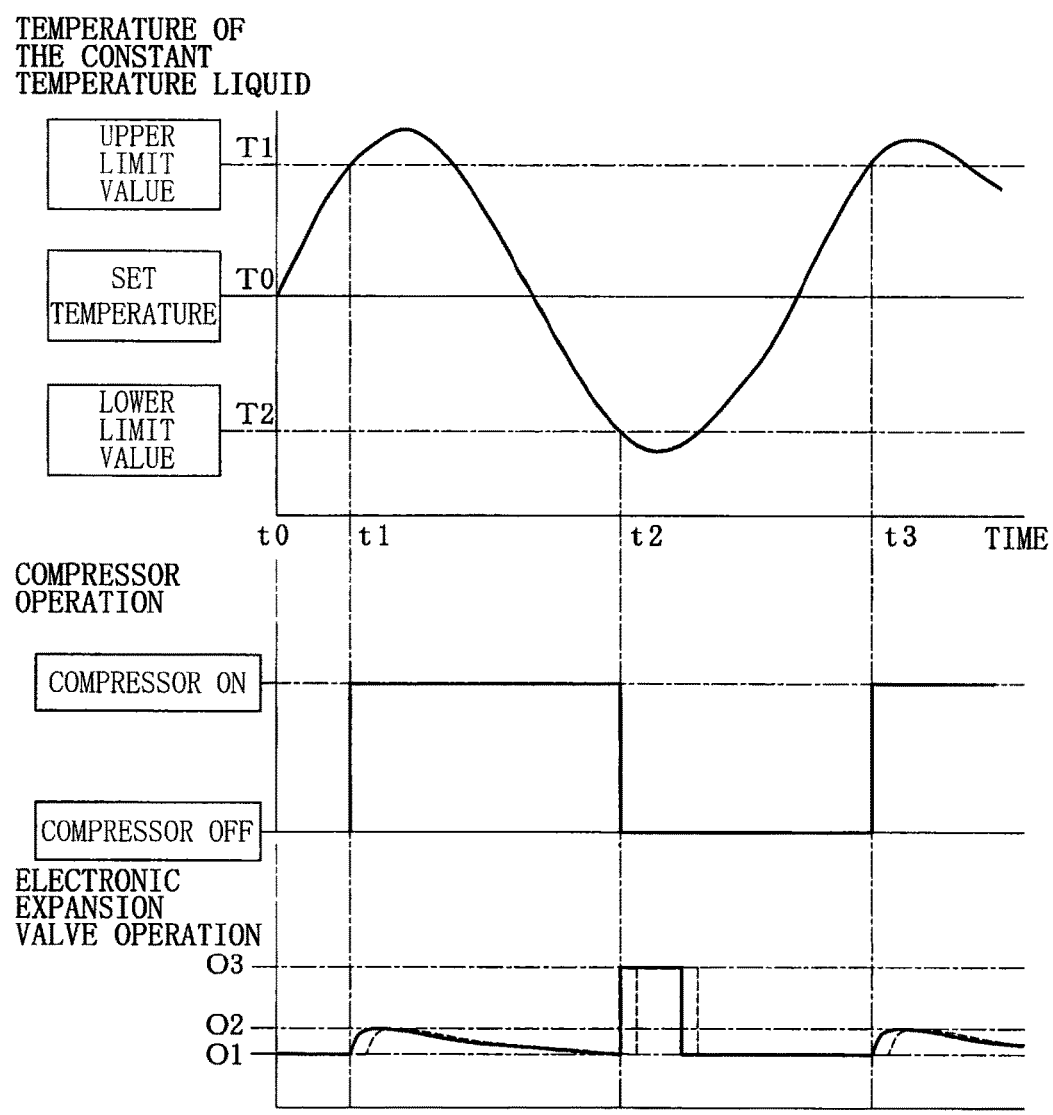
FIG. 2 is an operation timing chart of the constant temperature liquid circulation apparatus illustrated in FIG. 1.
Figure 3:
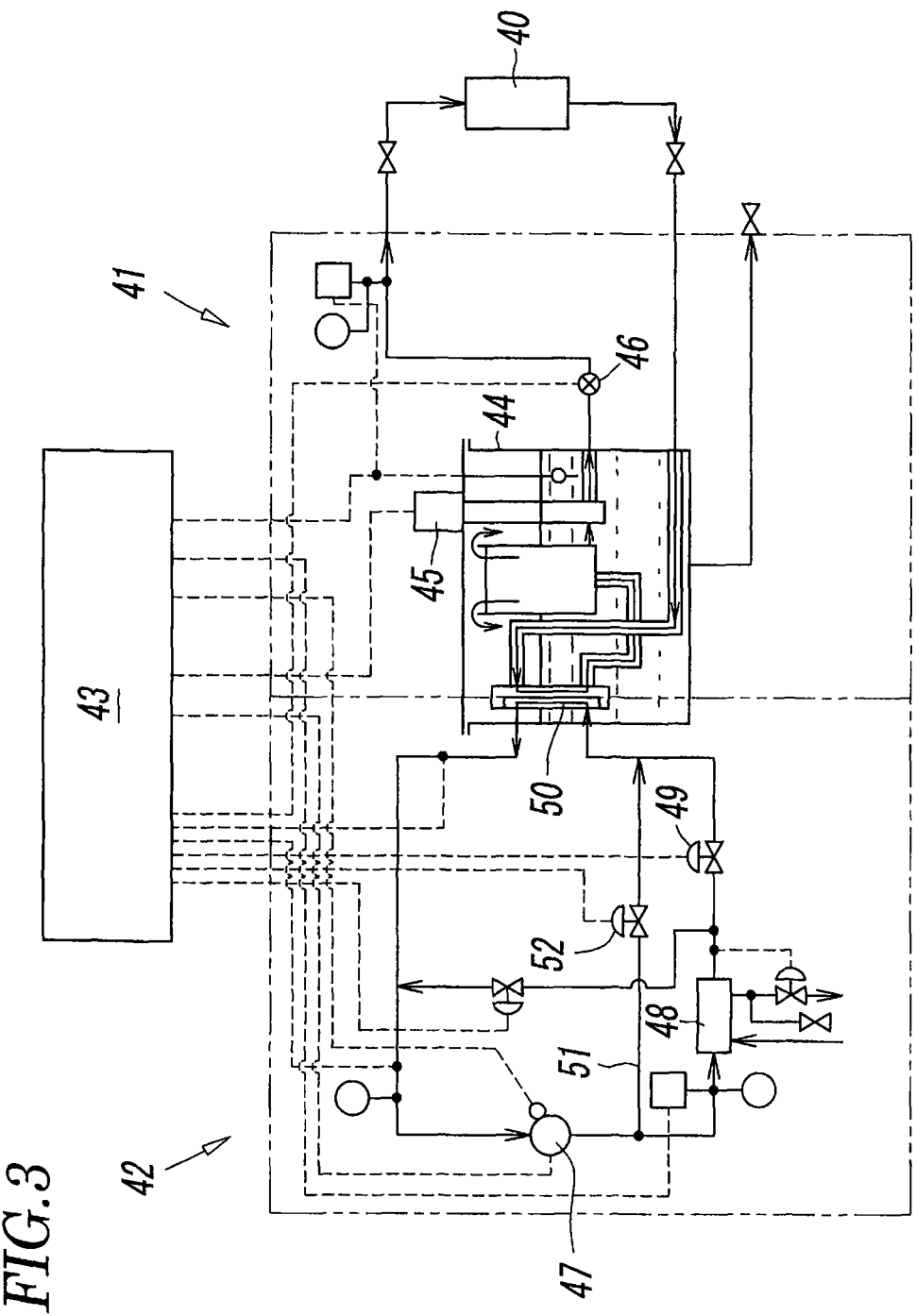
FIG. 3 is a configuration diagram of a conventional constant temperature liquid circulation apparatus.

FIG. 2 illustrating a timing chart in a case of performing temperature control of the constant temperature liquid by the control unit 3. This control example relates to a case where the load 5 generates heat and is cooled by the constant temperature liquid. Operations of performing temperature control of the constant temperature liquid in this case will be described following this timing chart.

First, the constant temperature liquid is supplied to the load 5 by the pump 6 being activated at point-in-time t0. At this point, the state of the compressor 20 in the refrigeration circuit 2 is off, and the coolant is not circulating so the constant temperature liquid is not being cooled. Accordingly, the constant temperature liquid supplied to the load 5 absorbs heat by cooling the load 5, and the temperature gradually rises from the set temperature T0. The electronic expansion valve 22 in the refrigeration circuit 2 is kept at a constant opening angle (steady angle) O1 when in a restricted opened state smaller than when full-open.

The temperature of the constant temperature liquid is constantly measured by the constant temperature liquid temperature sensor 7, and when the temperature of the constant temperature liquid reaches an upper limit temperature T1 higher than the set temperature T0 by a certain value, at the point-in-time t1, the compressor 20 turns on and coolant flows through the refrigeration circuit 2, and constant temperature liquid is cooled by thermal exchange being performed between the coolant flowing through the evaporator 23 and the constant temperature liquid flowing through the cooling tube 9 within the heat exchanger 8. At this time, the opening angle of the electronic expansion valve 22 is finely controlled in the restricted opened state whereby the flow of the coolant changes accordingly, thus finely adjusting the temperature of the constant temperature liquid. In the example illustrated in FIG. 2, immediately after the compressor 20 turns on, the electronic expansion valve 22 is controlled such that opening angle thereof increases following a curve to a controlled maximum opening O2 which is slightly greater than the steady angle O1, as indicated by the solid line, and then the opening angle gradually is reduced until it is finally the same as the steady angle O1.

Accordingly, the temperature of the constant temperature liquid temporarily exceeds the upper limit value T1 immediately after the compressor 20 turns on, but then starts dropping and gradually falls.

Upon the temperature of the constant temperature liquid falling below the set temperature T0 and reaching a lower limit value T2 which is lower than the set temperature T0 by a certain value, at point-in-time t2, the compressor 20 is turned off, circulation of coolant within the refrigeration circuit 2 stops, and thermal exchange between the coolant and the constant temperature liquid at the evaporator 23 is stopped. Immediately after the compressor 20 turns off, or preferably at the same time as turning off, the opening angle of the electronic expansion valve 22 is quickly and linearly increased to a pressure equalizing angle O3 which is greater than the controlled maximum opening O2, and maintained at this pressure equalizing angle O3 for a certain amount of time, after which the opening angle of the electronic expansion valve 22 is quickly and linearly returned to the steady angle O1, and this state is maintained.

Turning the compressor 20 off causes the temperature of the constant temperature liquid to temporarily fall below the lower limit value T2 immediately after then compressor 20 is turned off, but then starts rising and gradually climbs. When the electronic expansion valve 22 is being held at the pressure equalizing angle O3, coolant flows from the upstream side of the electronic expansion valve 22 which is the high pressure side to the downstream side of the electronic expansion valve 22 which is the low pressure side in the refrigeration circuit 2, and pressure equalizing operation is performed, so the pressure difference within the refrigeration circuit 2 becomes small in a short time.

When the temperature of the constant temperature liquid reaches the upper limit value at point-in-time t3 again, the compressor 20 turns on and the constant temperature liquid is cooled again. At this time, the pressure difference between the high pressure side and lower pressure side in the refrigeration circuit 2 is small due to the pressure equalizing operation of the electronic expansion valve 22, so the compressor 20 is not overloaded when the compressor 20 is activated, and the activation of the compressor 20 is performed smoothly without problem. These operations are repeated, thereby performing temperature adjustment of the constant temperature liquid, and the load 5 is cooled.

Thus, while general temperature adjustment of the constant temperature liquid is performed by on/off control of the compressor 20, fine temperature adjustment when the compressor 20 is on is performed by finely changing the opening angle of the electronic expansion valve 22 in the controlled opened state. Also, when the compressor 20 is turned off, the opening angle of the electronic expansion valve 22 is maintained for a certain amount of time at the pressure equalizing angle O3 which is greater than the opening angle when in the controlled opened state, thereby reducing the pressure difference between the high pressure side and lower pressure side in the refrigeration circuit 2. Pressure equalization prevents overload of the compressor 20 when turning on the next time, so stable on/off control of the compressor can be performed by performing pressure equalizing operations within the refrigeration circuit 2, and at the same time fine temperature adjustment of the constant temperature liquid can be performed by performing fine flow control of the coolant, with a simple circuit construction using only one electronic expansion valve 22.

Note that while the embodiment described above performs control of the opening angle of the electronic expansion valve 22 when the compressor 20 is turned on and off both at the same time of the compressor 20 turning on and off, an arrangement may be made regarding at least one of the compressor 20 turning on and off such as indicated by the dotted line in FIG. 2, where control of the opening angle of the electronic expansion valve 22 is performed after a predetermined amount of time elapses after the compressor 20 is turned on or off.

Also, the opening angle of the electronic expansion valve 22 does not necessarily have to change following the curve illustrated in FIG. 2, and may follow a different curve. Particularly, the opening angle may be increased or decreased following an inclined straight line or curve when increasing the opening angle of the electronic expansion valve 22 to the pressure equalizing angle O3, and when reducing the opening angle from the pressure equalizing angle O3 to the normal angle O1.

REFERENCE SIGNS LIST 1 constant temperature liquid circuit
2 refrigeration circuit
3 control unit
4 tank
5 load
6 pump
7 temperature sensor
20 compressor
21 condenser
22 electronic expansion valve
23 evaporator
O1 steady angle
O3 pressure equalizing angle
T0 set temperature
T1 upper limit value
T2 lower limit value

The invention claimed is:

1. A cooling liquid circulation apparatus comprising:
a cooling circuit which circularly supplies a liquid for adjusting temperature of a load,
a refrigeration circuit which adjusts the temperature of said liquid to a set temperature by thermal exchange with a coolant, and
a control unit which controls the apparatus;
wherein the cooling circuit comprises a tank which accommodates the cooling liquid, a pump which supplies the cooling liquid from the inside of the tank to the load, and a temperature sensor which measures the temperature of the cooling liquid supplied to the load;
wherein the refrigeration circuit is configured to connect sequentially in series:
a compressor which compresses the coolant in a gaseous phase to provide a high-temperature and high-pressure gaseous coolant,
a condenser which cools the high-temperature and high-pressure gaseous coolant fed from the compressor to turn the high-temperature and high-pressure gaseous coolant into a high-pressure liquid coolant,
an electronic expansion valve which expands the high-pressure liquid coolant fed from the condenser to produce a low-temperature and low-pressure liquid coolant, and
an evaporator which evaporates the low-temperature and low-pressure liquid coolant fed from the electronic expansion valve and makes thermal exchange with the cooling liquid, thus producing a low-pressure gaseous coolant which is fed to the compressor;
wherein the control unit is configured to perform an on/off control of the compressor and an open/close control of the electronic expansion valve depending upon the temperature of the cooling liquid measured by the temperature sensor, so that when the temperature of the cooling liquid rises higher than a predetermined set temperature and reaches an upper limit value, the compressor is brought into an operational state and the electronic expansion valve is controlled so as to shift an opening angle from a steady opening angle to a maximum opening angle in restriction, the maximum opening angle in restriction being greater than the steady opening angle, and when the temperature of the cooling liquid falls down lower than the predetermined set temperature and reaches a lower limit value, the compressor is brought out of the operational state, and the opening angle of the electronic expansion valve is controlled to a pressure equalizing opening angle greater than the maximum opening angle in restriction, and the pressure equalizing opening angle is maintained for a predetermined time, after the predetermined time the opening angle of the electronic expansion valve is controlled to the steady opening angle while the temperature of the cooling liquid is lower than the upper limit value and the compressor is off.

2. The cooling liquid circulation apparatus according to claim 1, wherein the control unit makes the opening angle of the electronic expansion valve return the steady opening angle from the pressure equalizing opening angle, thereafter the control unit controls so as to maintain the opening angle of the electronic expansion valve.

3. A cooling water circulation apparatus comprising:
a cooling water circuit which circularly supplies a cooling water for adjusting temperature of a load,
a refrigeration circuit which adjusts the temperature of the cooling water by thermal exchange with a coolant to a set temperature, and
a control unit which controls the overall apparatus;
wherein the cooling water circuit has a tank which accommodates the cooling water, a pump which supplies the cooling water from the inside of the tank to the load, and a temperature sensor which measures the temperature of the cooling water supplied to the load;
wherein the refrigeration circuit is configured to connect sequentially in series by a compressor which compresses the coolant in a gaseous phase so as to prepare a high-temperature and high-pressure gaseous coolant, a condenser which cools the high-temperature and high-pressure gaseous coolant fed from the compressor to turn into a high-pressure liquid coolant, an electronic expansion valve which makes expansion of the high-pressure liquid coolant fed from the condenser to produce a low-temperature and low-pressure liquid coolant, and an evaporator which evaporates the low-temperature and low-pressure liquid coolant fed from the electronic expansion valve by making thermal exchange with the cooling water so as to be a low-pressure gaseous coolant and feed this low-pressure gaseous coolant to the compressor;

wherein the control unit is configured to perform an on/off control of the compressor and an open/close control of the electronic expansion valve depending upon the temperature of the cooling water measured by the temperature sensor, wherein when the temperature of the cooling water rises higher than a predetermined set temperature and reaches an upper limit value, the compressor bringing into operation state and the electronic expansion valve is controlled so as to shift an opening angle from a steady opening angle to a maximum opening angle in restriction, the maximum opening angle in restriction being greater than the steady opening angle, when the temperature of the cooling water falls down lower than the predetermined set temperature and reaches a lower limit value, the compressor is brought out of the operation state, the opening angle of the electronic expansion valve is controlled to a pressure equalizing opening angle greater than the maximum opening angle in restriction, and the pressure equalizing opening angle being maintained for a predetermined time, after the predetermined time the opening angle of the electronic expansion valve is controlled to the steady opening angle while the temperature of the cooling water is lower than the upper limit value and the compressor is off.

4. A cooling liquid temperature adjustment method comprising employing a cooling liquid circulation apparatus, the cooling liquid circulation apparatus comprising a cooling liquid circuit which circularly supplies a temperature-adjusted cooling liquid to a load and a refrigeration circuit which adjusts the temperature of the cooling liquid by thermal exchange with a coolant, wherein the refrigeration circuit is configured to connect sequentially in series and circularly, a compressor which compresses the coolant in a gaseous phase to provide a high-temperature high-pressure gaseous coolant, a condenser which cools the high-temperature and high-pressure gaseous coolant fed from the compressor to turn into a high-pressure liquid coolant, an electronic expansion valve which expands the high-pressure liquid coolant fed from the condenser to produce a low-temperature and low-pressure liquid coolant, and an evaporator which evaporates the low-temperature and low-pressure liquid coolant fed from the electronic expansion valve and makes thermal exchange with the cooling liquid, thus producing a low-pressure gaseous coolant, which is fed to the compressor, said method comprising:

measuring the temperature of the cooling liquid supplied to the load by a temperature sensor;

performing on/off control of the compressor and open/close control of the electronic expansion valve in response to the temperature of the cooling liquid;

wherein when the temperature of the cooling liquid rises higher than a predetermined set temperature and reaches an upper limit value, the compressor is brought into an operational state and the electronic expansion valve is controlled so as to shift an opening angle from a steady opening angle to a maximum opening angle in restriction, the maximum opening angle in restriction being greater than the steady opening angle, and when the temperature of the cooling liquid falls down lower than the predetermined set temperature and reaches a lower limit value, the compressor is brought out of the operational state, the opening angle of the electronic expansion valve is controlled to a pressure equalizing opening angle greater than the maximum opening angle in restriction, and the pressure equalizing opening angle is maintained for a predetermined time, and after the predetermined time the opening angle of the electronic expansion valve is controlled to the steady opening angle while the temperature of the cooling liquid is lower than the upper limit value and the compressor is off.

5. The temperature adjustment method according to claim 4, wherein when the compressor is turned off the opening angle of the electronic expansion valve is maintained at the steady opening angle after the opening angle of the electronic expansion valve is returned the steady opening angle from the pressure equalizing opening angle.

* * * * *